United States Patent
Halbur et al.

(10) Patent No.: US 7,198,196 B2
(45) Date of Patent: Apr. 3, 2007

(54) STORED-VALUE CARD WITH MAGNET

(75) Inventors: Ted C. Halbur, Lino Lakes, MN (US);
Bettina C. Gillen, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 11/190,738

(22) Filed: Jul. 27, 2005

(65) Prior Publication Data
US 2007/0023531 A1 Feb. 1, 2007

(51) Int. Cl.
G06K 19/00 (2006.01)
G06K 7/08 (2006.01)
G06K 19/06 (2006.01)

(52) U.S. Cl. .................. 235/487; 235/449; 235/493

(58) Field of Classification Search ............... 235/375, 235/380, 381, 449, 487
See application file for complete search history.

(56) References Cited

U.S. PATENT DOCUMENTS

| 3,762,628 | A | 10/1973 | Sargent |
| 5,607,101 | A | 3/1997 | Saito |
| 5,699,956 | A | 12/1997 | Brennan |
| 5,840,355 | A | 11/1998 | Prescott et al. |
| 5,949,050 | A | 9/1999 | Fosbenner et al. |
| 5,983,537 | A * | 11/1999 | Johnson .................. 40/124.04 |
| 5,993,218 | A | 11/1999 | Kapell |
| 6,092,841 | A * | 7/2000 | Best et al. .................. 283/56 |
| 6,255,948 | B1 | 7/2001 | Wolpert et al. |
| 6,547,626 | B1 | 4/2003 | Burrows |
| 7,004,398 | B1 | 2/2006 | Francis et al. .............. 235/486 |
| 7,055,273 | B2 * | 6/2006 | Roshkoff ..................... 40/638 |
| 7,063,258 | B1 * | 6/2006 | Karolewicz ................. 235/449 |
| 2003/0067159 | A1 * | 4/2003 | Ritchie et al. .............. 283/101 |
| 2003/0204980 | A1 * | 11/2003 | Niec ........................... 40/600 |

OTHER PUBLICATIONS

Magnetic Poetry, http://www.magneticpoetry.com.
Magnetic Poetry, Product Detail Page, http://www.magneticpoetry.com/detail.asp?PRODUCT_ID=3000.

* cited by examiner

*Primary Examiner*—Daniel Stcyr
*Assistant Examiner*—April Taylor
(74) *Attorney, Agent, or Firm*—Dicke, Billig & Czaja, P.L.L.C.

(57) ABSTRACT

A stored-value card assembly comprises a stored-value card and a magnetic sheet. The stored-value card defines a first surface and a second surface opposite the first surface. The first surface includes an account identifier linking the stored-value card to at least one of a financial account or a financial record. The stored-value card is substantially non-magnetic. The magnetic sheet is placed on the second surface of stored-value card and is removably coupled to the stored-value card. Methods of assembling a stored-value card assembly, methods of encouraging purchase and facilitating use of a stored-value card assembly, and other embodiments are also disclosed.

19 Claims, 9 Drawing Sheets

STORED-VALUE CARD WITH MAGNET

BACKGROUND OF THE INVENTION

Stored-value cards and other financial transactions cards come in many forms. A gift card, for example, is a type of stored-value card that includes pre-loaded or selectively loaded monetary value. In one example, a consumer buys a gift card having a specified value for presentation as a gift to another person. In another example, a consumer is offered a gift card as an incentive to make a purchase. A gift card, like other stored-value cards, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards provide a number of advantages to both the consumer and the retailer.

SUMMARY OF THE INVENTION

One aspect of the present invention relates to a stored-value card assembly comprising a stored-value card and a magnetic sheet. The stored-value card defines a first surface and a second surface opposite the first surface. The first surface includes an account identifier linking the stored-value card to at least one of a financial account or a financial record. The stored-value card is substantially non-magnetic. The magnetic sheet is placed on the second surface of stored-value card and is removably coupled to the stored-value card. Other related products and methods are also disclosed and provide additional advantages.

BRIEF DESCRIPTION OF THE DRAWINGS

Embodiments of the invention will be described with respect to the figures, in which like reference numerals denote like elements, and in which.

DETAILED DESCRIPTION

A gift card or other stored-value card is adapted for making purchases of goods and/or services from e.g. a retail store or website. According to one embodiment, an original consumer buys a stored-value card assembly to give a recipient who in turn is able to use a stored-value card of the stored-value card assembly at a retail store or a setting to pay for goods and/or services. A stored-value card assembly, according to embodiments of the present invention, provides the consumer with one or more magnets in addition to the ability to pay for goods and/or services with the stored-value card. In one embodiment, the inclusion of one or more magnets in the stored-value card assembly promotes the sale and/or loading of the stored-value card by potential consumers and/or bearers of the stored-value card. In addition, the one or more magnets provide the consumer or bearer of the stored-value card assembly with amusement.

Figure 1:
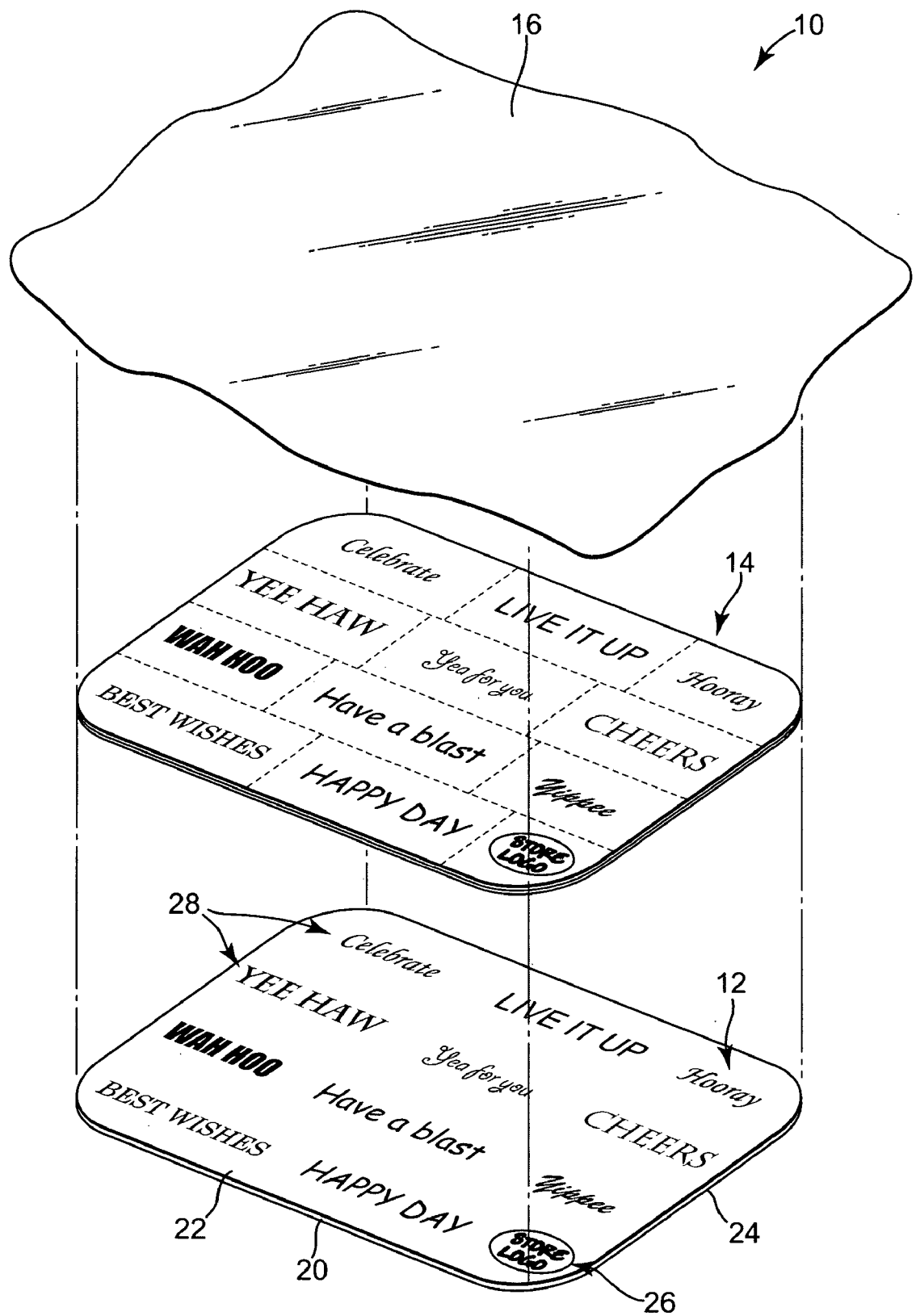
FIG. 1 is an exploded, top perspective view of one embodiment of a stored-value card assembly, according to the present invention.

Turning to the figures, FIG. 1 illustrates an exploded, top perspective view of one embodiment of the stored-value card assembly 10 according to the present invention. The stored-value card assembly 10 includes a stored-value card 12, a magnetic article or sheet 14, and a wrapper 16. Stored-value card 12 provides overall rigidity to stored-value card assembly 10 and supports magnetic sheet 14. Wrapper 16 extends about the remainder of stored-value card assembly 10 to protect magnetic sheet 14 and/or to effectively secure magnetic sheet 14 to stored-value card 12.

Figure 2:
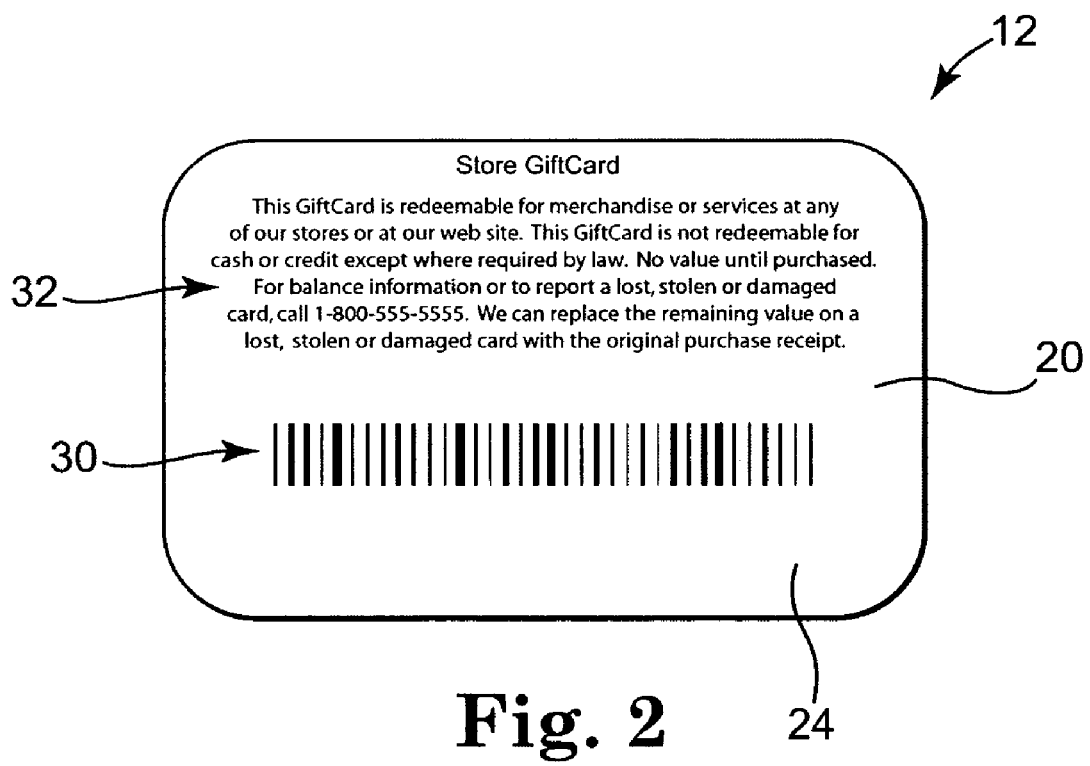
FIG. 2 is a bottom view of a stored-value card of the stored-value card assembly of FIG. 1, according to the present invention.

Collectively referring to FIGS. 1 and 2, stored-value card 12 includes a substantially planar panel 20 defining a first surface 22 and a second surface 24 opposite the first surface 22. First and second surfaces 22 and 24 are each substantially planar. In one embodiment, panel 20 is generally rectangular in shape and is of a size similar to that of an identification card, a credit card, or other card sized to fit in a wallet of a card bearer. In particular, in one embodiment, stored-value card 12 is about 8.5 cm long, about 5.5 cm wide, and less than about 1 mm thick. In other embodiments, panel 20 is otherwise shaped as a square, circle, oval, star, or any other suitable shape. Accordingly, panel 20 is formed of a somewhat rigid yet flexible material similar to that commonly used for identification cards, credit cards, etc. In one embodiment, panel 20 is formed of a paper, cardstock, plastic, e.g. polycarbonate or polyvinyl chloride (PVC), etc. In one embodiment, panel 20 is formed of injected molded plastic or cut from sheet-stock plastic material. Accordingly, panel 20 is one example of means for supporting magnetic sheet 14.

First surface 22 is configured to receive magnetic sheet 14 and, in one example, includes at least one of brand indicia 26 and decorative indicia 28. In one embodiment, brand indicia 26 identify a brand, e.g. a product brand, a store brand, etc., associated with stored-value card assembly 10. In one embodiment, first surface 22 is printed with or otherwise includes a background design, seasonal or holiday identifier, media format indicia, and/or other suitable indicia. Indicia 26 disposed on stored-value card 12 are one example of means for associating stored-value card assembly 10 with at least one of a product, a brand, a store, a holiday, a season, an occasion, a media format, e.g. characters, logos, scenes, or other illustrations or photographs related to at least one of a movie, television show, book, video game, etc.

Decorative indicia 28 are included on stored-value card 12 to provide stored-value card 12 with an aesthetically pleasing appearance to a bearer of stored-value card 12. In one embodiment, decorative indicia 28 are similar to or correspond with decorative indicia of magnetic sheet 14, as will be further described below. In one embodiment, decorative indicia 28 include one or more of graphics, text, patterns, colors, or other suitable objects.

Second surface 24 of stored-value card 12 includes an account identifier 30, such as a barcode, a magnetic strip, a smart chip or other electronic device, a radio frequency identification (RFID) device, or other suitable identifier readily readable by a point-of-sale terminal, account access station, kiosk, or other suitable device. In one embodiment, account identifier 30 is printed on second surface 24 of stored-value card 12. Account identifier 30 indicates a financial account or record to which stored-value card 12 is linked. The financial account or record of the monetary balance on stored-value card 12 optionally is maintained on a database, other electronic or manual record-keeping system, or, in the case of "smart" cards for example, on a chip or other electronic device on stored-value card 12 itself. Accordingly, by scanning account identifier 30, a financial account or record linked to stored-value card 12 is identified and can subsequently be activated, have amounts debited therefrom, and/or have amounts added thereto. Account identifier 30 is one example of means for associating stored-value card 12 with a financial account or a financial record.

In one embodiment, redemption indicia 32 are included on second surface 22. Redemption indicia 32 indicate that stored-value card assembly 10 is redeemable for the purchase of goods and/or services and that, upon use, a value of the purchased goods and/or services will be deducted from the financial account or record linked to stored-value card 12. In one embodiment, redemption indicia 32 include phrases such as "<NAME OF STORE>GiftCard" and "This GiftCard is redeemable for merchandise or services at any of our stores or at our website," and/or provides help or phoneline information in the case of a lost, stolen, or damaged stored-value card, etc. In one embodiment, other indicia are also included on second surface 24 including other objects, texts, backgrounds, graphics, etc.

Figure 3:
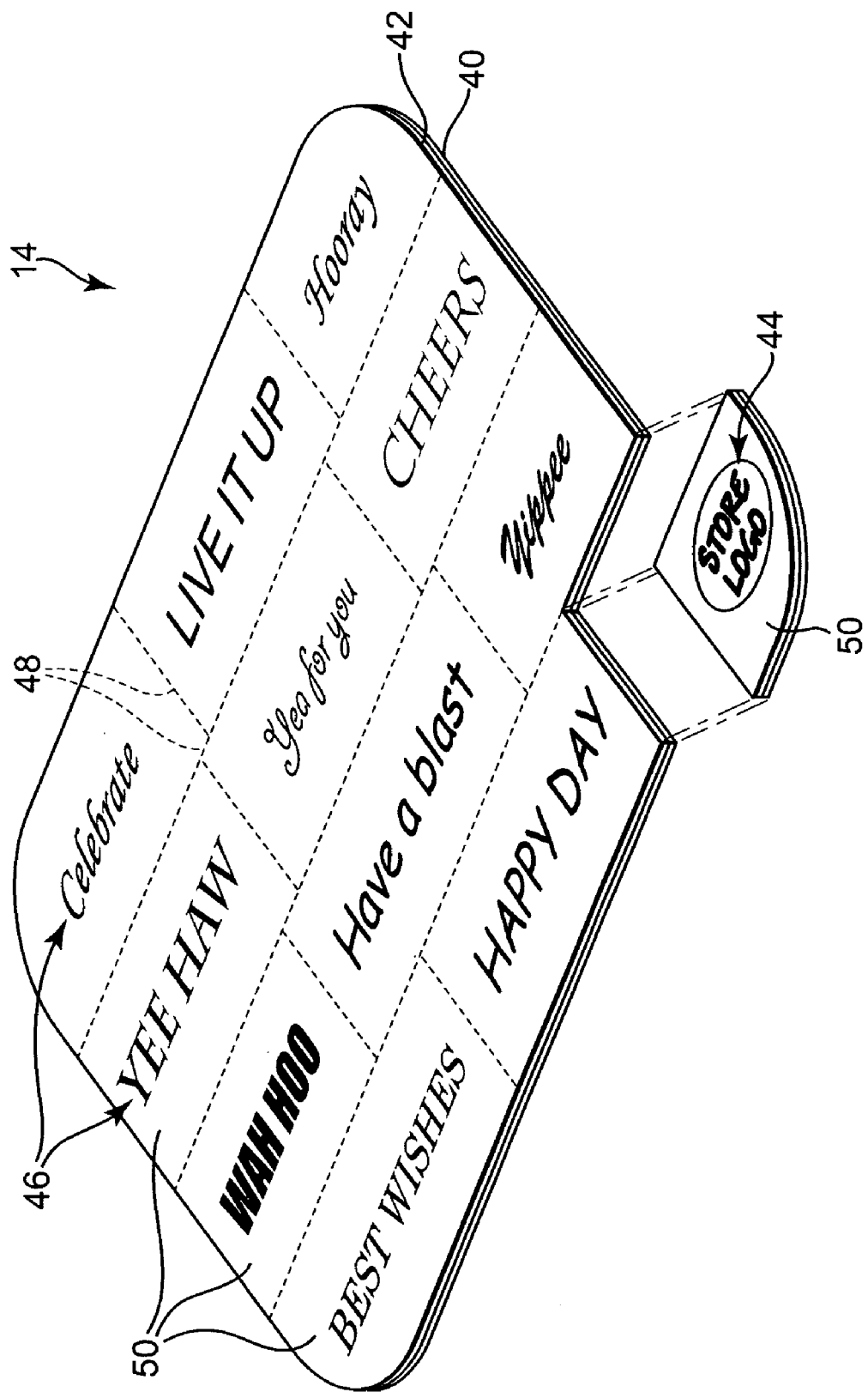
FIG. 3 is a top perspective view of one embodiment of a magnetic sheet of the stored-value card assembly of FIG. 1, according to the present invention.

Referring to FIG. 3, in one embodiment, magnetic sheet 14 is a dual-layer sheet including a magnetic layer 40 and a non-magnetic layer 42. Magnetic layer 40 is substantially planar and is formed of a magnetic material capable of adhering to ferric surfaces, such as a surface of a refrigerator door, or other magnetic surface. In one example, magnetic layer 40 is sized similarly to stored-value card 12.

Non-magnetic layer 42 is configured to be adhered to or otherwise secured to magnetic layer 40. In particular, non-magnetic layer 42 is placed on and coupled to magnetic layer 40 with an adhesive or other securing material disposed therebetween. In one embodiment, one of magnetic layer 40 and non-magnetic layer 42 are formed with an adhesive backed surface for coupling to the other of magnetic layer 40 and non-magnetic layer 42. In other embodiments, an independent adhesive is applied between the two layers 40 and 42 or layers 40 and 42 are otherwise coupled such as by lamination.

Non-magnetic layer 42 is substantially planar and, in one embodiment, is sized similarly to magnetic layer 40. Non-magnetic layer 42 is formed of any suitable material configured to be adhered to magnetic layer 40 and to be printed with or otherwise have disposed thereon at least one of brand indicia 44 and decorative indicia 46. In one embodiment, non-magnetic layer 42 is formed of a paper, cardstock, plastic, or other suitable material capable of being configured for aesthetic reasons. Non-magnetic layer 42 is one example of means for presenting decorative indicia 46. In one embodiment, non-magnetic layer 42 is alternatively an at least partially magnetic layer configured to be printed with indicia or otherwise having indicia disposed thereon. In one embodiment, magnetic sheet 14 is formed of a single magnetic layer 40 having at least one surface configured to have indicia printed to or otherwise disposed thereon.

Brand indicia 44 identify a brand, e.g. a product brand, a store brand, etc. associated with stored-value card assembly 10. In one example, brand indicia 44 are substantially similar to brand indicia 26 of stored-value card 12. Decorative indicia 46 may include a background design, seasonal holiday identifier, media format indicia, or any other suitable indicia. Decorative indicia 46 may include any text, graphics, or other suitable objects contributing to the aesthetic appearance of magnetic sheet 14.

In one embodiment, decorative indicia 46 include a plurality of indicium each corresponding to one of a plurality of magnets to be formed from magnetic sheet 14. For example, decorative indicia 46 include text for a plurality of celebratory terms such as "Celebrate," "Hooray," "Cheers," "Best Wishes," etc. suitable for inclusion with a stored-value card assembly 10 configured for presentation to a recipient having a birthday, anniversary, graduation, new baby, new job, or other reason to celebrate.

In one embodiment, in which a plurality of magnets 50 are to be formed from the single magnetic sheet 14, non-magnetic layer 42 and at least a portion of magnetic layer 44 are scored as indicated by score lines 48 at a position to define individual ones of the plurality of magnets 50 to be formed by magnetic sheet 14. In one embodiment, score lines 48 are configured to facilitate detachment of each one of the plurality of magnets 50 from the remainder of the plurality of magnets 50. For example, as illustrated in FIG. 3, magnetic sheet 14 can be snapped or otherwise cut or broken along score lines 48 to release individual ones of the plurality of magnets 50 from the remainder of magnetic sheet 14. Score lines 48 are one example of means for defining plurality of magnets 50 on magnetic sheet 14.

Figure 4:
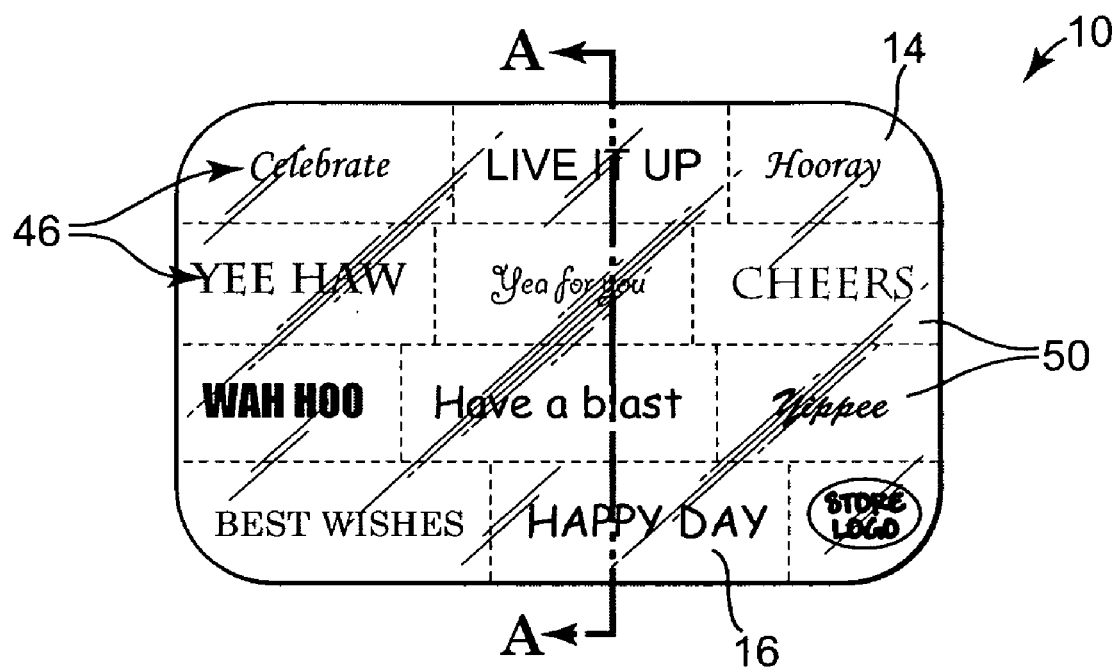
FIG. 4 is a top view of the stored-value card assembly of FIG. 1.
Figure 4A:
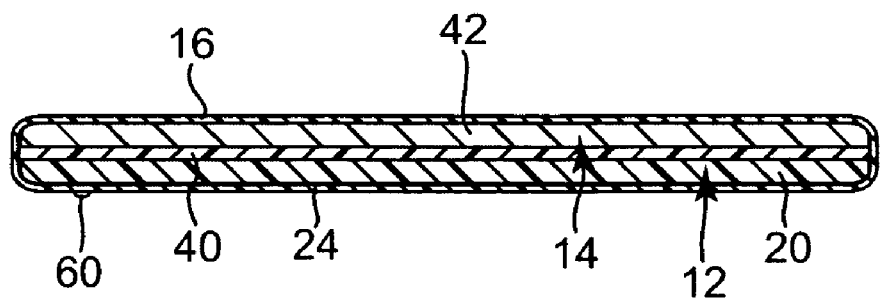
FIG. 4A is a cross-sectional view of FIG. 4 taken along the line A—A.

As indicated with reference to FIGS. 1, 4 and 4A, stored-value card 12 and magnetic sheet 14 are partially secured to one another and/or protected from the external environment via wrapper 16. In one embodiment, wrapper 16 is a cellophane or other suitable material configured to be sealed about stored-value card 12 and magnetic sheet 14. In one example, wrapper 16 is generally placed over magnetic sheet 14, extends around the edges of stored-value card 12 and magnetic sheet 14, and down around second surface 24 of stored-value card 12. In one embodiment, wrapper 16 includes a heat seal 60 adhering one portion of wrapper 16 to another to collectively form and entirely encompass the remainder of the stored-value card assembly 10. Wrapper 16 is one example of means for coupling stored-value card 12 and magnetic sheet 14.

In one embodiment, wrapper 16 is generally transparent or translucent in order to allow a bearer of stored-value card assembly 10 to view decorative indicia 46 of magnetic sheet 14 as well as account identifier 30 (illustrated in FIG. 2) through wrapper 16. More specifically, in one embodiment, account identifier 30 is viewable and scannable through wrapper 16. In this respect, stored-value card 12 can be activated or loaded by scanning account identifier 30 through wrapper 16. In other examples, wrapper 16 is another suitable or generally translucent or transparent material secured about and vacuumed or otherwise sealed to the remainder of stored-value card assembly 10. In one example, wrapper 16 is heat shrunk to fit around the remainder of stored-value card assembly 10. In other embodiments, other packaging or wrappers are used in addition to and as an alternative to wrapper 16 to secure stored-value card 12 and magnetic sheet 14 and/or to protect the remainder of stored-value card assembly 10 from external environment.

Figure 5A:
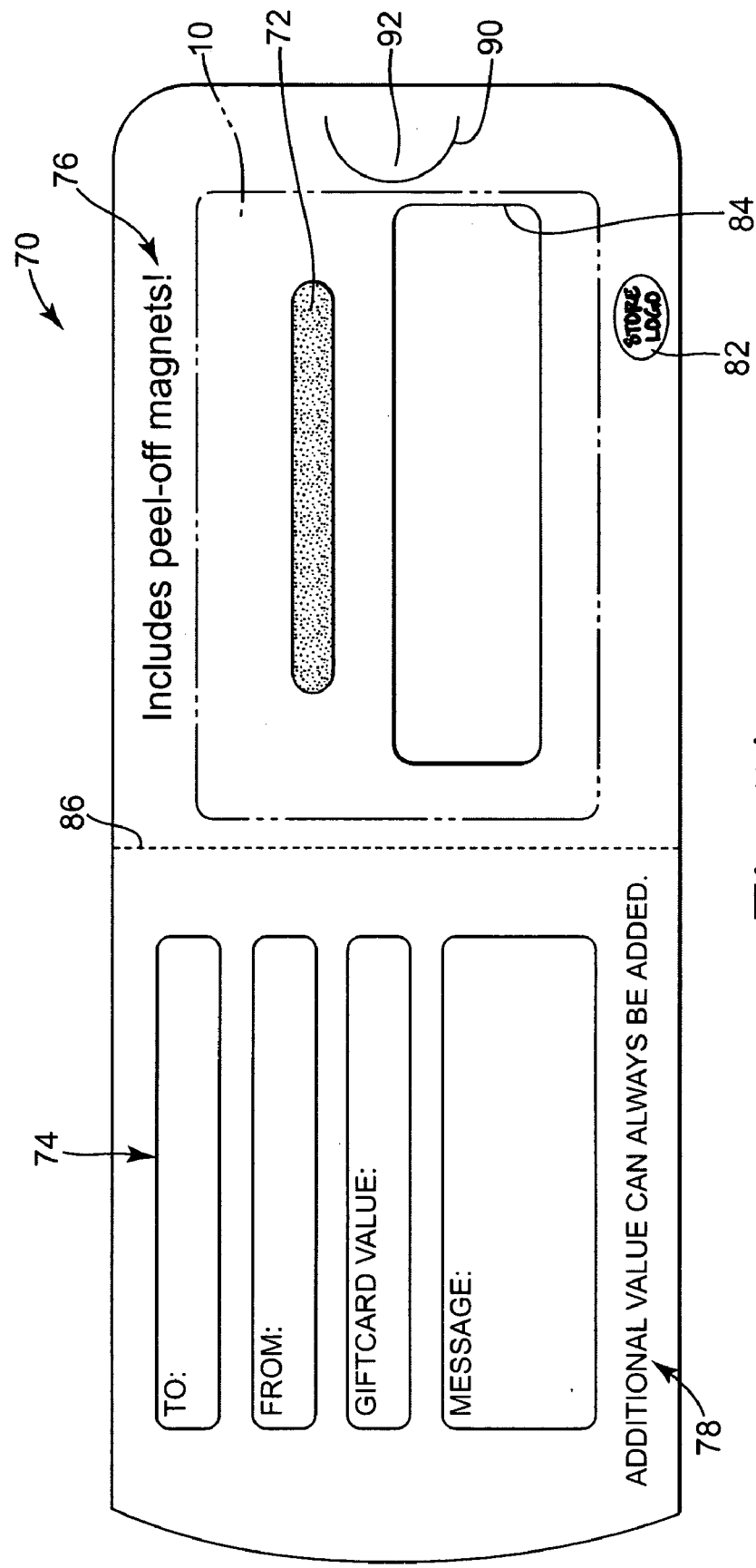
FIG. 5A is a top view of one embodiment of an unfolded backer for a stored-value card assembly, according to the present invention.
Figure 5B:
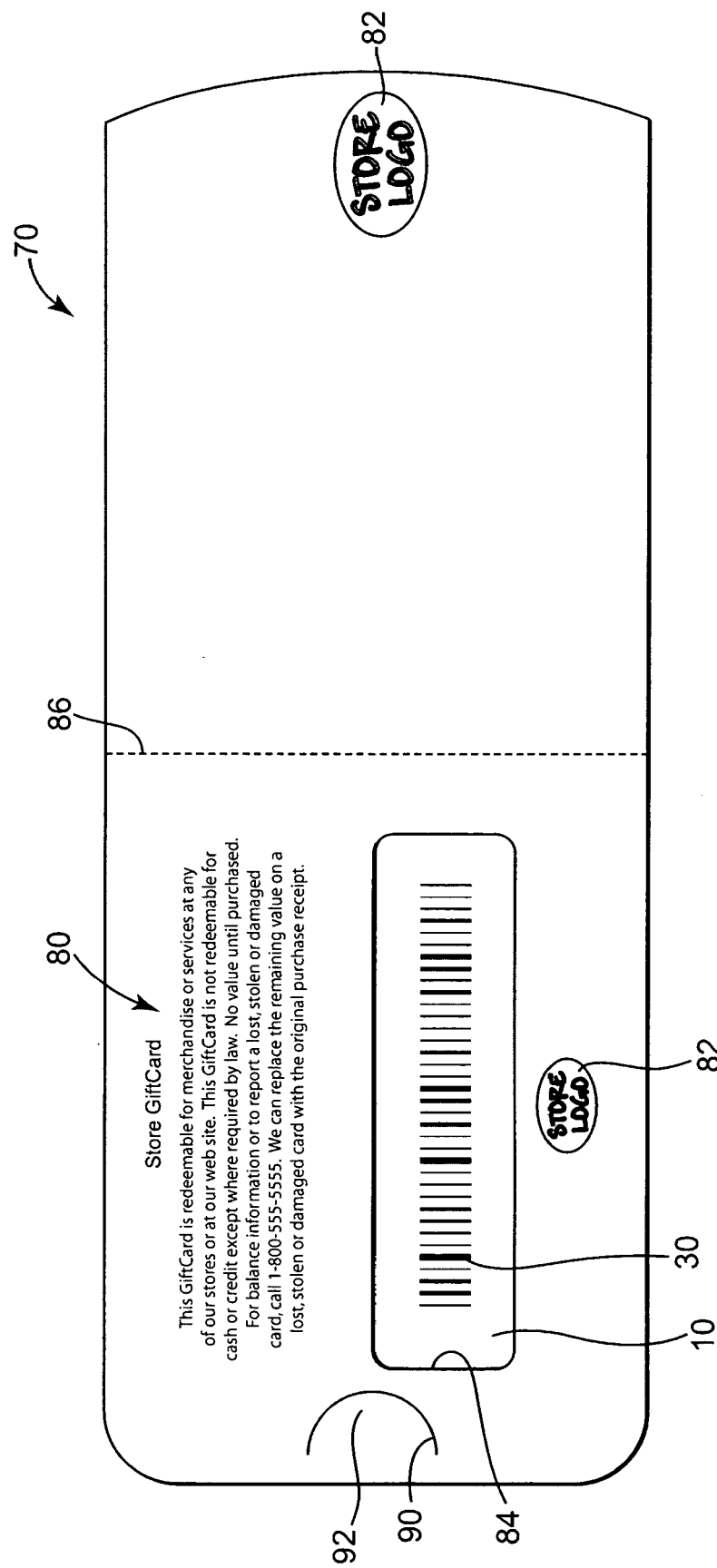
FIG. 5B is a bottom view of the unfolded backer of FIG. 5A.

FIGS. 5A and 5B illustrate a carrier or backer 70 for supporting stored-value card assembly 10. Stored-value card assembly 10, which is represented in phantom lines in FIG. 5A, is readily releasably attached to backer 70, for example by an adhesive 72 or the like. Backer 70 comprises a single layer or multiple layers of paper or plastic material, for example, generally in the form of a relatively stiff but bendable/flexible card. Use of other materials is also contemplated. Backer 70 displays indicia, graphics or text information including store logo(s), store name(s), slogans, advertising, instructions, directions, brand indicia, promotional information, holiday indicia, seasonal indicia, media format identifiers, characters, and/or other information.

Indicia 74 for example include to, from, initial gift card value, and message fields. Indicia 76 promote that stored-value card assembly 10 includes magnets 50 (illustrated in FIG. 3). In particular, in one example, indicia 76 state that stored-value card assembly 10 "Includes peel-off magnets!" Indicia 78 notify a user and promote that additional value can always be added to or reloaded to stored-value card 12.

Indicia 80 indicate that stored-value card 12 is redeemable for the purchase of goods and/or services and that upon use, a value of the purchased goods and/or services will be deducted from the financial account or record linked to stored-value card 12. In one embodiment, indicia 80 include phrases such as "<NAME OF STORE> GiftCard" and "This GiftCard is redeemable for merchandise or services at any of our stores or at our website," and/or provides help or phone line information in case of a lost, stolen, or damaged stored-value card 12, etc. Brand indicia 82 identify a store, brand, department, etc. and/or services associated with stored-value card 12. Any of indicia 74, 76, 78, 80, 82, or other indicia optionally may appear anywhere on backer 70 or stored-value card assembly 10. Additional information besides that specifically described and illustrated herein may also be included.

Backer 70 includes a window or opening 84 for displaying account identifier 30 of stored-value card 12 as illustrated in FIG. 5B. As previously described, account identifier 30 is adapted for accessing a financial account or a financial record associated with stored-value card 12 for activating, loading, or debiting from the financial account or financial record. Accordingly, window 84 allows access to account identifier 30 to activate and/or load stored-value card 12 without removing stored-value card assembly 10 from backer 70. In one embodiment, a portion of backer 70 alternatively is configured to be folded away from the remainder of backer 70 to access account identifier 30 without removing stored-value card assembly 10 from backer 70.

In one embodiment, backer 70 is a bi-fold substrate defining a fold line 86, about which backer 70 is foldable roughly in half. In FIGS. 5A and 5B, backer 70 is unfolded, i.e. is in an open configuration. According to one embodiment, FIG. 5A illustrates surfaces of backer 70 that will be supported on a rack or other fixture to be visible to a consumer of a retail store who is considering the purchase of stored-value card assembly 10. In another example, while on display in a retail store, backer 70 is folded back about fold line 86 to present only the surfaces of backer 70 illustrated in FIG. 5A that are positioned on the same side of fold line 86 as stored-value card assembly 10 to a consumer. In such an embodiment, indicia 74 and 78 would not be visible to a consumer when backer 70 and stored-value card assembly 10 are placed for display in a retail store. Backer 70 is one example of means for supporting stored-value card assembly 10 for display in a retail setting.

After purchase, backer 70 is foldable about fold line 86 such that the FIG. 5A surfaces of backer 70 are folded toward each other and stored-value card assembly 10 is enclosed in a compact package formed by foldable backer 70. In this manner, the surfaces of backer 70 illustrated in FIG. 5B are disposed toward the outside of the folded, compact package, according to embodiments of the invention. In one embodiment, folded backer 70 effectively wraps stored-value card assembly 10 for presentation from a consumer to a recipient. Folding on the other direction about fold line 86 for display on a rack in a retail setting, or about other fold lines of backer 70 is also contemplated.

In one embodiment, a substantially semi-circular cut 90 is formed through backer 70 near an edge of backer 70 spaced from and substantially parallel to fold line 86. Semi-circular cut 90 extends partially toward fold line 86 and defines a substantially semi-circular flap 92, which can be partially bent away from the remainder of backer 70. More specifically, upon folding of backer 70 about fold line 86, to close backer 70, an opposing edge of backer 70 is tucked beneath flap 92 to maintain backer 70 in a folded or closed position. Other backers similar to backer 70 can be used with various sizes and shapes of stored-value card assembly 10. Other backers or packages are also contemplated for supporting stored-value card assembly 10.

Figure 6:
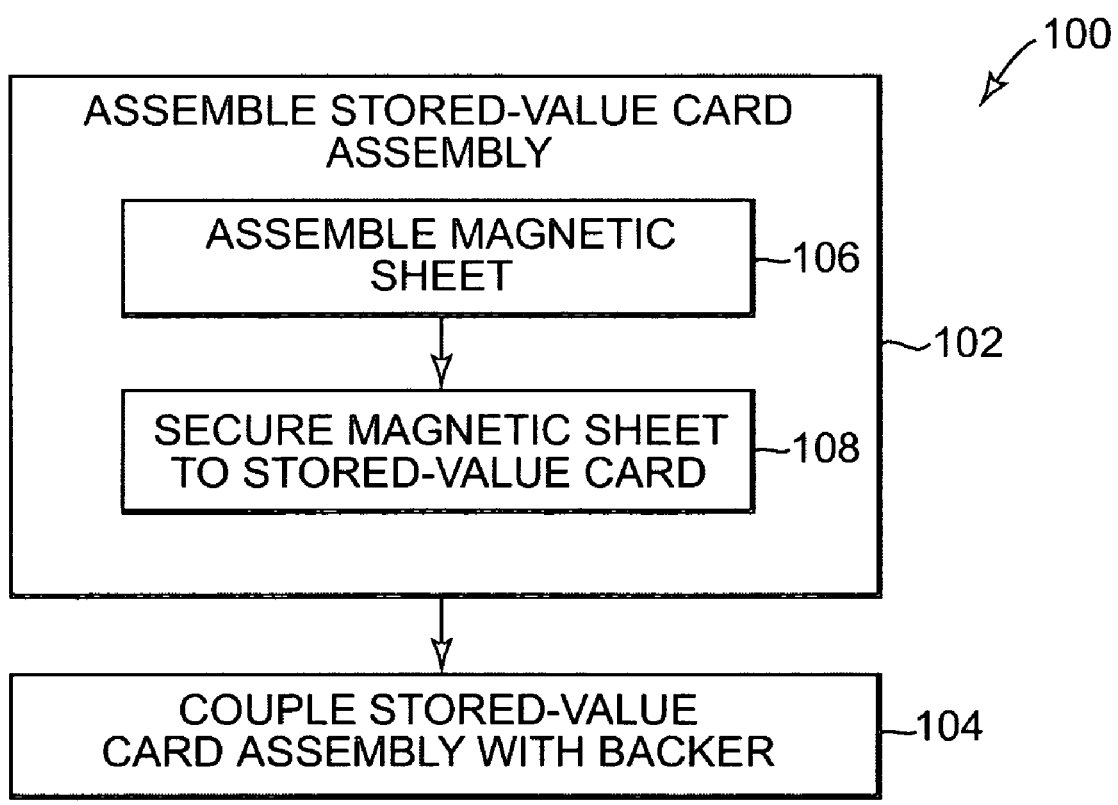
FIG. 6 is a flow chart illustrating one embodiment of a method of assembling a stored-value card assembly, according to the present invention.

FIG. 6 is a flow chart illustrating one embodiment of a method 100 of assembling stored-value card assembly 10. Referring to FIG. 6 in view of FIG. 1, at 102, stored-value card assembly 10 is assembled and, at 104, stored-value card assembly 10 is coupled with backer 70 (illustrated in FIGS. 5A and 5B). In particular, in one embodiment, assembling stored-value card assembly 10 at 102 includes assembling magnetic sheet 14 at 106 and securing the magnetic sheet 14 to stored-value card 12 at 108. In particular, at 106, magnetic sheet 14 is assembled by adhering, laminating, or otherwise securing non-magnetic layer 42 to magnetic layer 40. At 108, the assembled magnetic sheet 14 is secured to stored-value card 12, for example, by applying wrapper 16 to extend around magnetic sheet 14 and stored-value card 12.

At 104, the assembled stored-value card assembly 10 is coupled with backer 70 to form a retail product. In one example, stored-value card assembly 10 is coupled to backer 70 with an adhesive or other selectively releasable material or device. In one embodiment, backer 70 is folded into a folded position for shipment and/or display to retail settings. Backer 70 is, more specifically, folded by folding backer 70 about fold line 86 such that the backer surfaces illustrated in FIG. 5B are moved toward each other. As such, a portion of backer 70 with stored-value card assembly 10 is visible from one side of folded backer 70. Backer 70 can also be folded in the opposite direction about fold line 86 to substantially enclose stored-value card assembly 10. In one embodiment, backer 70 is displayed in an unfolded position hung from a support arm within the retail setting.

Figure 7:
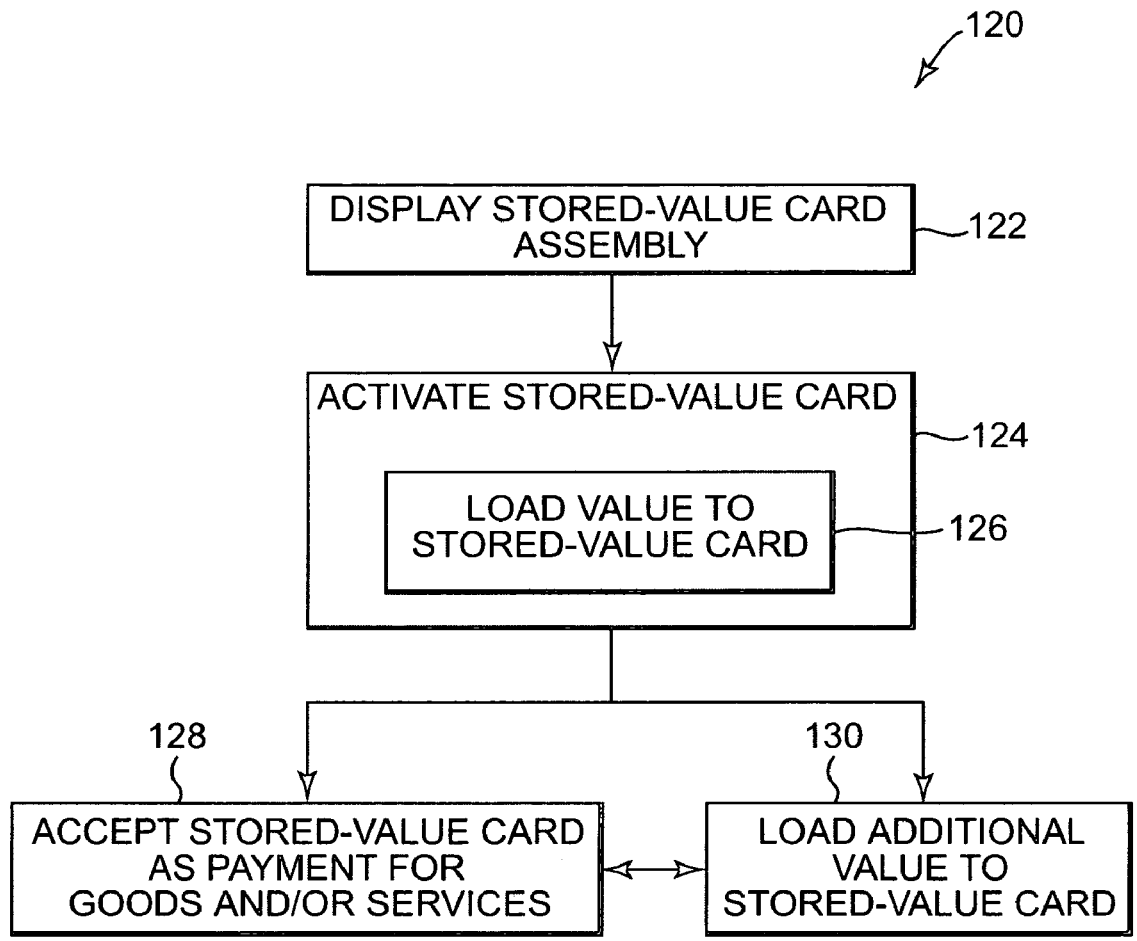
FIG. 7 is a flow chart illustrating one embodiment of a method of encouraging purchase and facilitating use of a stored-value card assembly, according to the present invention.

FIG. 7 is a flow chart illustrating one embodiment of a method 120 of providing stored-value card assembly 10 for sale and use by consumers. At 122, stored-value card assembly 10 is placed or hung from a rack, shelf, or other similar device to display stored-value card assembly 10 for sale to potential consumers. In one example, stored-value card assembly 10 is placed for retail sale when secured to backer 70. In one embodiment, a depiction of stored-value card assembly 10 is placed on website for viewing and purchase by potential consumers. In one embodiment, stored-value card assembly 10 is displayed without backer 70.

At 124, a consumer who has decided to purchase stored-value card assembly 10 presents the stored-value card assembly 10 on backer 70 to a retail store employee, retail store kiosk, or other person or device to scan account identifier 30 at stored-value card 12 to access a financial account or financial record linked to account identifier 30. In particular, account identifier 30 is scanned or otherwise accessed through window 84 of backer 70. Upon accessing the financial account or financial record, at 126, value is added to the financial account or financial record. Thus, stored-value card 12 is activated and loaded. Once stored-value card 12 is activated and loaded, stored-value card 12 can be used by the consumer or any other bearer of stored-value card 12 to purchase goods and/or services at the retail store or other affiliated retail setting or website.

At 128, the retail store or other affiliated retail setting or website accepts stored-value card 12 as payment towards the purchase of goods and/or services made by the current bearer of stored-value card 12. In particular, the value currently loaded on stored-value card 12 is applied towards the purchase of goods and/or services. At 130, additional value is optionally loaded on stored-value card 12 at a point of sale terminal, kiosk, or other area of the retail store or related setting. Upon accepting stored-value card 12 as payment at 128, the retail store or related setting can subsequently perform either operation 128 or operation 130 as requested by a current bearer of stored-value card 12. Similarly, upon loading additional value on stored-value card 12 at 130, the retail store or related setting can subsequently perform either operation 130 again or operation 128. In one example, the ability to accept stored-value card 12 as payments for goods and/or services is limited by whether the financial account or financial record associated with stored-value card 12 has any value at the time of redemption.

Figure 8:
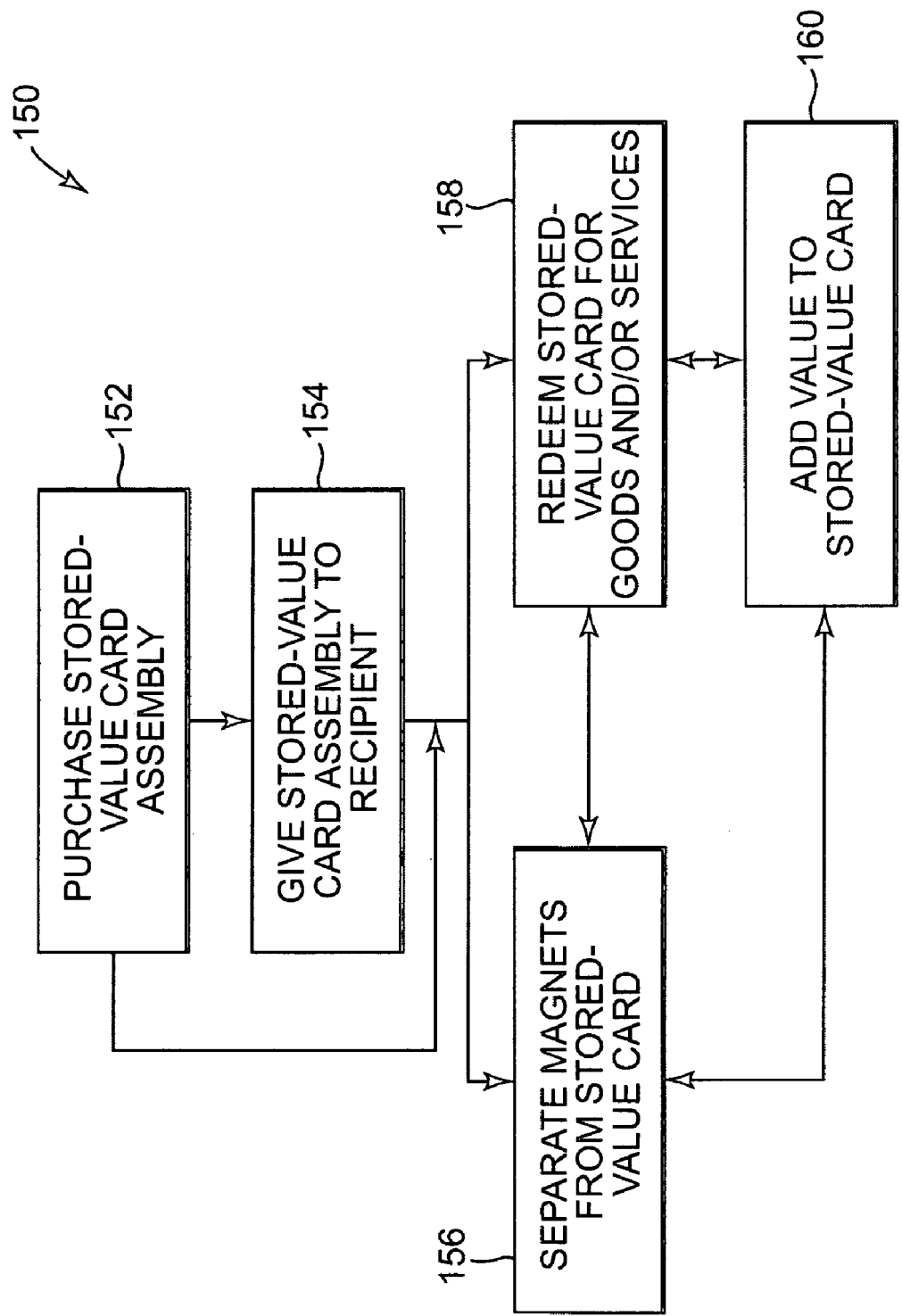
FIG. 8 is a flow chart illustrating one embodiment of a method of using a stored-value card assembly, according to the present invention.

FIG. 8 is a flow chart illustrating one embodiment of a method 150 of using stored-value card assembly 10. At 152, a potential consumer of stored-value card assembly 10, which is displayed in a retail store or viewed on a website, decides to and does purchase stored-value card assembly 10 from a retail store or website setting. Stored-value card assembly 10 can be displayed and purchased alone or as part of a retail product along with backer 70. Upon purchasing a stored-value card assembly 10, a retail store employee, a retail store kiosk, or other person or device scans account identifier 30 through wrapper 16 and/or window 84 of backer 70. Upon scanning account identifier 30, the financial account or record linked to account identifier 30 is accessed and activated to load value onto stored-value card 12.

At 154, the consumer optionally gives stored-value card assembly 10 to a recipient, such as a graduate, relative, friend, expectant parents, one having a recent or impending birthday, a couple having a recent or impending anniversary, etc. In one embodiment, a plurality of stored-value cards assemblies 10 are purchased and given to party goers, such as at a birthday party, New Year's Eve party, etc. as party favors or gifts. As an alternative, the consumer can keep stored-value card assembly 10 for his or her own use.

At 156, the consumer or recipient, whoever is in current ownership or otherwise is the current bearer of stored-value card assembly 10, removes stored-value card assembly 10 from backer 70 if stored-value card assembly 10 is coupled with backer 70. The current bearer of stored-value card assembly 10 separates or removes magnetic sheet 14 from stored-value card 12. In particular, wrapper 16 is removed from around stored-value card 12 and magnetic sheet 14 and, subsequently, magnetic sheet 14 is separated from stored-value card 12. During or after this operation, the bearer of stored-value card 12 can optionally separate the plurality of magnets 50 from one another and/or otherwise apply magnetic sheet 14 to a magnetic surface.

At 158, the current bearer of stored-value card 12 redeems stored-value card 12 for goods and/or services from the retail store or website. At 160, the current bearer of stored-value card 12 optionally adds value to stored-value card 12, and more particularly, to the financial account or financial record associated with stored-value card 12, at the retail store or over the Internet. Upon separating magnetic sheet 14 at 156, redeeming stored-value card 12 at 158, or adding value to stored-value card 12 at 160, the current bearer of stored-value card assembly 10 subsequently can perform any of operations 156, 158, or 160 as desired. In one embodiment, the ability of the current bearer to repeat redeeming stored-value card 12 at 158 is limited by whether the financial account or financial record associated with stored-value card 12 has any remaining value at the time of attempted redemption.

Although described above as occurring at a single retail store or website, in one embodiment, purchasing stored-value card assembly 10 at 152, redeeming stored-value card 12 at 158, and adding value to stored-value card 12 at 160, can each be performed at any one of a number of stores adapted to accept stored-value card 12 or over the Internet. In one example, a number of stores are each part of a chain or similarly branded stores. In one example, a number of stores includes at least one website and/or at least one conventional brick and mortar store.

Stored-value cards come in many forms, according to embodiments of the invention. The gift card, like other stored-value cards, can be "re-charged" or "re-loaded" at the direction of the original consumer, the gift recipient, or third party. The term "loading on" or "loaded on" herein should be interpreted to include adding to the balance of a financial account or financial record associated with a stored-value card. The balance associated with the stored-value card declines as the card is used, encouraging repeat visits. The card remains in the user's purse or wallet, serving as an advertisement or a reminder to revisit the associated merchant. Gift cards according to embodiments of the invention provide a number of advantages to both the consumer and the merchant. Other gift cards and stored-value cards according to embodiments of the invention include loyalty cards, merchandise return cards, electronic gift certificates, employee cards, frequency cards, prepaid cards, and other types of cards associated with or representing purchasing power or monetary value, for example.

Although the invention has been described with respect to particular embodiments, such embodiments are meant for illustrative purposes only and should not be considered to limit the invention. Various alternatives and changes will be apparent to those of ordinary skill in the art. For example, stored-value card 12 optionally is made of a plastic, paper, generally stiff paper, other substrate, or the like. Adding value to stored-value card 12 optionally includes adding either a fixed amount or an amount that can be chosen by the consumer or other user. Other modifications within the scope of the invention and its various embodiments will be apparent to those of ordinary skill.

What is claimed is:

1. A stored-value card assembly comprising:
a stored-value card defining a first surface and a second surface opposite the first surface, the first surface including an account identifier linking the stored-value card to at least one of a financial account or a financial record, wherein the stored-value card is substantially non-magnetic; and
a magnetic sheet placed on the second surface of stored-value card and being removably coupled to the stored-value card, wherein the magnetic sheet comprises a plurality magnets defined by score lines, further wherein the magnetic sheet is constructed to be divided along the score lines to form separate ones of the plurality of magnets.

2. The stored-value card assembly of claim 1, wherein the magnetic sheet includes a first layer and a second layer adhered to the first layer, wherein the first layer includes a magnetic material.

3. The stored-value card assembly of claim 2, wherein the second layer includes printable media.

4. The stored-value card assembly of claim 1, wherein the magnetic sheet has a size similar to a size of the stored-value card.

5. The stored-value card assembly of claim 1, wherein the second surface of the stored-value card includes first decorative indicia, and the magnetic sheet includes second decorative indicia, and wherein the first decorative indicia is substantially similar to the second decorative indicia.

6. The stored-value card assembly of claim 1, further comprising:
a package configured to substantially enclose the stored-value card and the magnetic sheet, wherein the package is configured to removably couple the stored-value card to the magnetic sheet.

7. The stored-value card assembly of claim 6, wherein the package is substantially transparent.

8. The stored-value card assembly of claim 6, wherein the package includes a shrink wrap material.

9. The stored-value card assembly of claim 1, in combination with a backer configured to support the stored-value card assembly.

10. The combination of claim 9, wherein the backer includes an aperture, and the stored-value card is positioned upon the backer such that the account identifier of the stored-value card is accessible through the aperture of the backer.

11. A financial transaction card comprising:
a magnetic article including means for dividing the magnetic article into a plurality of magnets, wherein the plurality of magnets are configured to be separated from each other along the means for dividing;
means for supporting the magnetic article, the means for supporting including means for associating the financial transaction card with a financial account or a financial record; and
means for coupling the magnetic article with the means for supporting.

12. The financial transaction card of claim 11, wherein one or more of the plurality of magnets includes means for presenting decorative indicia.

13. The financial transaction card of claim 11, wherein the means for coupling encloses both the magnetic article and the means for supporting the magnetic article.

14. A method of assembling a stored-value card assembly, the method comprising:
defining a plurality of magnets on a magnetic sheet with score lines, wherein the plurality of magnets are configured to be separated from each other along the score lines;
placing the magnetic sheet on a first surface of a financial transaction card, wherein the financial transaction card defines a second surface opposite the first surface, the second surface including an account identifier linking the stored-value card to a financial account or a financial record, and
coupling the financial transaction card to the magnetic sheet.

15. The method of claim 14, wherein coupling the stored-value card to the magnetic sheet includes enclosing the stored-value card and the magnetic sheet with a substantially transparent wrapper.

16. The method of claim 14, further comprising:
coupling the stored-value card coupled with the magnetic sheet onto a backer configured to support the stored-value card and the magnetic sheet during display and to substantially enclose the stored-value card and the magnetic sheet for presentation to a recipient.

17. A method of encouraging purchase and facilitating use of a financial transaction card, the method comprising:
displaying a financial transaction card assembly, the assembly including a financial transaction card, a plurality of magnets supported by the financial transaction card, and a wrapper enclosing the financial transaction card and the plurality of magnets, and the financial transaction card defining an account identifier linked to a financial account or a financial record; and
activating the financial transaction card by accessing the account identifier through the wrapper, wherein activating the financial transaction card readies the financial transaction card for subsequent use as payment for one or more of goods and services;
wherein displaying the financial transaction card assembly includes providing the plurality of magnets as a single magnetic sheet configured to be divided into the plurality of magnets.

18. The method of claim 17, wherein displaying the financial transaction card assembly includes displaying a backer coupled to the financial transaction card assembly, further wherein the backer supports the financial transaction card assembly for display and is configured to substantially enclose the financial transaction card assembly for presentation to a recipient.

19. A combination comprising:
a stored-value card assembly including:
a stored-value card defining a first surface and a second surface opposite the first surface, the first surface including an account identifier linking the stored-value card to at least one of a financial account or a financial record, wherein the stored-value card is substantially non-magnetic, and
a magnetic sheet placed on the second surface of stored-value card and being removably coupled to the stored-value card; and
a backer configured to support the stored-value card assembly, wherein the backer includes an aperture, and the stored-value card is positioned upon the backer such that the account identifier of the stored-value card is accessible through the aperture of the backer.

* * * * *